(12) United States Patent
Cheng et al.

(10) Patent No.: US 7,218,332 B2
(45) Date of Patent: May 15, 2007

(54) METHOD AND APPARATUS FOR WINDOWING AND IMAGE RENDITION

(75) Inventors: Hui Cheng, Bridgewater, NJ (US); Ying-wei Lin, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 1211 days.

(21) Appl. No.: 10/135,139

(22) Filed: Apr. 30, 2002

(65) Prior Publication Data

US 2003/0202702 A1    Oct. 30, 2003

(51) Int. Cl.
*G06T 15/00* (2006.01)
(52) U.S. Cl. ...................... 345/639; 382/173
(58) Field of Classification Search ............... 345/639, 345/640, 641; 382/173
See application file for complete search history.

(56) References Cited

U.S. PATENT DOCUMENTS

| | | | |
|---|---|---|---|
| 5,293,430 A | 3/1994 | Shiau et al. | 382/173 |
| 5,488,674 A * | 1/1996 | Burt et al. | 382/284 |
| 5,706,417 A * | 1/1998 | Adelson | 345/640 |
| 5,765,029 A | 6/1998 | Schweid et al. | 706/52 |
| 5,835,630 A | 11/1998 | Schweid et al. | 382/173 |
| 5,850,474 A | 12/1998 | Fan et al. | 382/173 |
| 6,240,205 B1 | 5/2001 | Fan et al. | 382/173 |

* cited by examiner

*Primary Examiner*—Almis R. Jankus
(74) *Attorney, Agent, or Firm*—Fay Sharpe LLP

(57) ABSTRACT

Systems and methods are presented for processing and rendering image data during a single pass through the image data. A method includes loading scanlines of image data into a rolling band buffer, performing a windowing technique on the image data, and determining if a class change was experienced by any window having a portion in an output scanline of the buffer. The method further includes processing image data in the output scanline for a window portion that experienced a class change, using a blended rendering algorithm. If no class change is detected, the method includes processing image data in the output scanline for the window portion using a class-based rendering algorithm. The method optionally includes rendering processed image data for the output scanline to a rendering device. According to other features, an apparatus includes a rolling band buffer, a windowing processor, class-based rendering algorithms, and a blended rendering algorithm.

20 Claims, 10 Drawing Sheets

METHOD AND APPARATUS FOR WINDOWING AND IMAGE RENDITION

BACKGROUND OF INVENTION

The invention relates to a method and apparatus for segmenting data associated with an image into windows, classifying the image data within each window, and processing the data using a rendering algorithm during a single pass through the image data. It finds particular application in conjunction with the use of a spatial adaptive fuzzy rendering algorithm for blended rendering and will be described with particular reference thereto. However, it is to be appreciated that the present invention is also amenable to other like applications.

Data associated with an image is often stored in the form of multiple scanlines, each scanline comprising multiple pixels. When processing this type of image data, it is helpful to know the type of image represented by the data. For instance, the image data could represent text, graphics, pictures, a particular frequency halftone, a contone, or some other recognized image type. The image data could be all one type, or some combination of image types. Classifying image data into recognized image types is known as image segmentation.

Windowing is an important step to improve the accuracy and the robustness of an image segmentation algorithm. It is known in the art to take a page of image data and to separate the image data into windows of similar image types. However, windowing and rendering techniques usually require multiple passes through the image data. A first pass to generate and classify windows in the image data and a second pass to process and render the image data according to the image type classes.

For example, a page of image data may include a halftone picture with accompanying text describing the picture. In order to efficiently process the image data, it is known to separate the page of image data into two windows, a first window representing the halftone image, and a second window representing the text. Processing the page of image data is then efficiently carried out by tailoring the processing to the type of image data being processed.

It is also known to separate image data into windows and to classify and process the image data within the windows by making either one or two passes through the page of image data. Typically, the one-pass method uses local image statistics (e.g., image data for a central pixel and neighboring pixels or pixels in the same scanline). If local statistics are used, different parts of the same window may be classified differently, and undesirable artifacts may be generated when the rendering algorithm is suddenly switched from one to another. The one-pass method is quicker, but it does not allow the use of future context to correct for windows that have already been generated and classified incorrectly. Since local statistics (i.e., micro-segmentation) are usually not reliable and accurate enough to be used directly, two-pass windowing techniques are usually applied to improve both the accuracy and the robustness of image processing.

In the two-pass method, information obtained from all scanlines can be used to generate windows and classify the image type of the window. In other words, future context can be used when generating and classifying windows in the first and second scanlines. In the two-pass method, during the first pass, the image is separated into windows, and a judgment is made about the type of image data in each window. At the end of the first pass, the image type class for each pixel is recorded in memory. During the second pass, the information from the first pass (i.e., the image type class data) is used to process the image data. Unfortunately, storing image type information for each pixel of a page of image data requires a great deal of memory, which increases the cost of an apparatus performing this method.

U.S. Pat. No. 5,850,474 to Fan et al. discloses an example of a two-pass method and apparatus for segmenting image data into windows and for classifying the windows as typical image types. The method includes a step of making a first pass through the image data to identify windows and to record the beginning points and image types of each of the windows, and a step of making a second pass through the image data to label each of the pixels as a particular image type and to render each pixel accordingly.

Multiple accesses of image data are required in the two-pass method because windows can have different sizes, shapes and layout. To generate windows "correctly," the entire page is first gone through. For example, two windows that are separated at the top of the page could merge at the bottom and become one. If only local statistics are used to classify the window before the entire page is examined, different regions of the same window can be classified in different classes. Therefore, different rendering algorithms are applied within the same window, and undesirable artifacts may be generated along the boundaries where the rendering algorithms are changed within the window. For example, a "V"-shape window 1 is shown in FIG. 1. If the left portion 3 is classified as a first image type class and rendered using a first rendering algorithm, and the right portion 5 is classified as a second image type class and rendered using a second rendering algorithm, at the area where the two parts are connected (i.e., boundaries 7, 9) undesirable artifacts may be observed due to the abrupt transition between the rendering algorithms. Previously, the solution has been to implement a two-pass method to go through the whole page to generate windows, store image data for the entire page, and render the image in a second pass. However, there are disadvantages in current two-pass windowing techniques. One disadvantage is that the image data needs to be accessed more than one time, causing delays. Another disadvantage is that a large memory area is required to store the image data before it can be output to storage or rendering devices. In many practical applications, the amount of memory required may prohibit the use of windowing techniques.

BRIEF SUMMARY OF INVENTION

Thus, there is a particular need for a one-pass method for window generation/classification and image rendition that uses future context to adapt processing and rendering based on image information generated earlier to minimize undesirable artifacts when class changes within a window are experienced. The present invention contemplates a new and improved method and apparatus for one-pass windowing and image rendition that overcomes the above-referenced problems and others.

In one aspect of the invention, a method for processing image data during a single pass through an image is provided. The method includes the following steps: a) loading a next scanline of image data into a first-in-first-out (FIFO) rolling band buffer; b) performing windowing on the image data in the buffer; c) determining if a class change was experienced by any window in the output scanline of the buffer; d) if a class change was experienced, processing image data in the output scanline for that window using a blended rendering algorithm; and e) if a class change was not experienced, processing image data in the output scanline for that window using a class-based rendering algorithm associated with the image type class for the window.

In another aspect of the invention, a method for processing and rendering image data during a single pass through an image is provided. The method includes the following steps: a) loading scanlines of image data into a FIFO rolling band buffer until the buffer is full; b) performing windowing on the image data in the buffer; c) processing image data for each window in the output scanline of the buffer using a class-based rendering algorithm associated with the image type class for the window; d) rendering the processed image data for the output scanline of the buffer to a rendering device; e) loading a next scanline of image data into the buffer; f) performing windowing on the image data in the buffer; g) determining if a class change was experienced by any window in the output scanline of the buffer; h) if a class change was experienced, processing image data in the output scanline for that window using a blended rendering algorithm; i) if a class change was not experienced, processing image data in the output scanline for that window using a class-based rendering algorithm associated with the image type class for the window; and j) rendering the processed image data for the output scanline of the buffer to a rendering device.

In yet another aspect of the invention, an image processor for processing image data during a single pass through an image is provided. The image processor includes: a FIFO rolling band buffer; a windowing processor in communication with the buffer; class-based rendering algorithms in communication with the buffer and the windowing processor; and a blended rendering algorithm in communication with the class-based rendering algorithms and the windowing processor.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
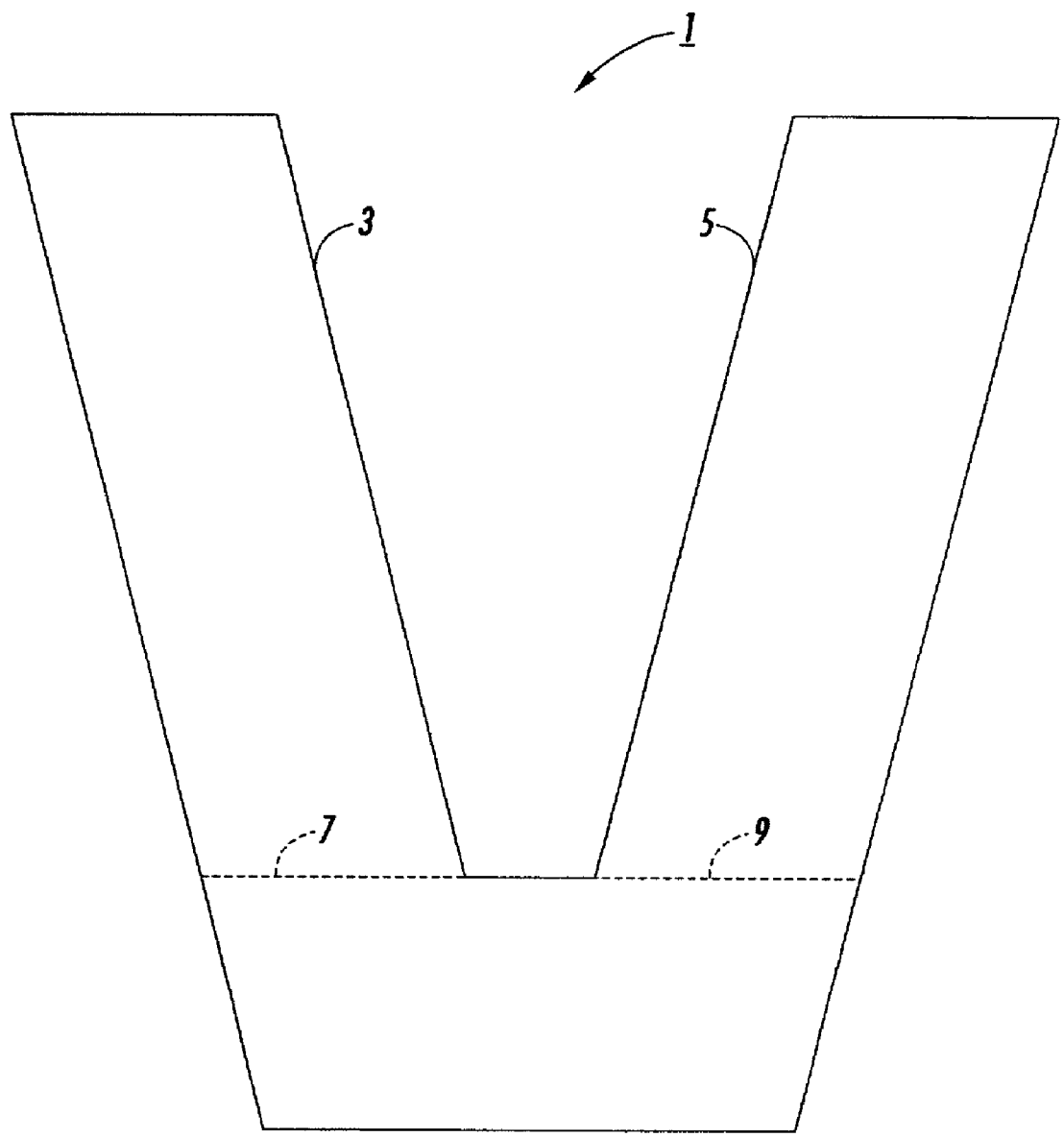
FIG. 1 shows an image with a "V"-shaped window.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

Figure 2:
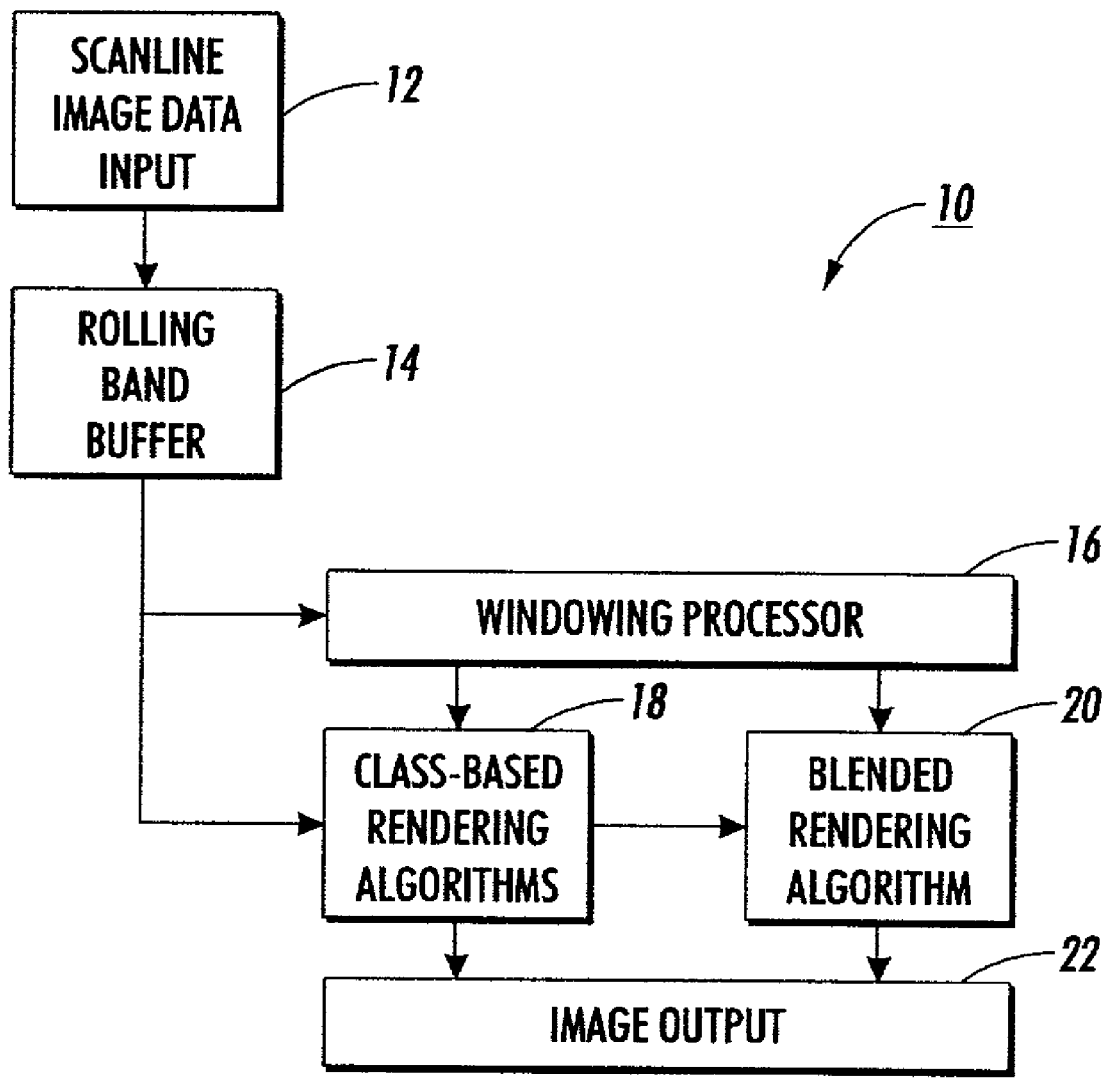
FIG. 2 is a simplified block diagram of an image processor in an embodiment of the invention.

With reference to FIG. 2, a simplified block diagram of an image processor 10 in an embodiment of the invention is provided. The image processor 10 receives image data from a scanline image data input 12 and includes a rolling band buffer 14, a windowing processor 16, class-based rendering algorithms 18, and a blended rendering algorithm 20. Depending on circumstances described in more detail below, either the class-based rendering algorithms 18 or the blended rendering algorithm 20 provide processed image data to an image output 22 for rendering by a rendering device (e.g., printer, display, etc.). The rolling band buffer 14 permits image processing to be performed on a portion (i.e., N scanlines) of an image instead of the full image, unless the full image actually contains less scanlines than the rolling band buffer 16. The windowing processor 16 provides window generation and classification. The class-based rendering algorithms 18 provide image processing and rendering of image data associated with a window according to the image type class of the window. The blended rendering algorithm 20 provides image processing and "fuzzy" rendering to blend between areas rendered according to the class-based algorithms for a window when a class change in the window is experienced. The combination of the rolling band buffer 14, windowing processor 16, class-based rendering algorithms 18, and blended rendering algorithm 20 provides a one-pass image processor that advances through an image scanline by scanline with a spatially adaptive fuzzy rendering algorithm that uses future context to adapt processing and rendering to minimize undesirable artifacts when class changes within a window are experienced.

The scanline image data input 12 communicates a scanline of image data to the rolling band buffer 14, advancing through the entire image to be rendered scanline by scanline. The rolling band buffer 14 stores image data for up to N scanlines at any one time. The number of scanlines (N) in the rolling band buffer 14 is selected so that a transition from one image type class at the top of the buffer to another image type class at the bottom of the buffer for a window can be processed and rendered in a manner that produces a gradual blend that eliminates or minimizes undesirable image artifacts. For example, in an embodiment of the invention capable of operating at resolutions up to 400 spots per inch (SPI), a rolling band buffer 14 may include 100 scanlines. It is to be understood the foregoing is only an example, and the specific size of the rolling buffer will be dependent upon the particular implementation.

The scanline at the bottom of the rolling band buffer 14 is the input scanline, also known as the current scanline, and is identified by a scanline pointer (SP). The scanline at the top of the rolling band buffer 14 is the output scanline and is identified by a renderline pointer (RP). The output scanline is the scanline that has been advancing through the rolling band buffer 14 the longest. Thus, there is an inherent delay between processing and rendering a scanline using the image processor 10. Among other parameters, the delay is associated with the number of scanlines (N) in the rolling band buffer 14. The rolling band buffer 14 is filled as the scanline image data input 12 moves scanline by scanline from the top of the image to the bottom. If the image contains more scanlines than the rolling band buffer 14, the rolling band buffer 14 continues advancing through the image scanline by scanline in a first-in-first-out (FIFO) fashion. The contents of the rolling band buffer 14 are accessible to the windowing processor 16 and the class-based rendering algorithms 18. Typically, the rolling band buffer 14 is accessed sequentially by the windowing processor 16 and the class-based rendering algorithms 18. However, alternative schemes are also possible.

The windowing processor 16 segments the image data stored in the rolling band buffer 14 by generating windows and classifying the windows into commonly recognized image type classes (e.g., text, graphics, pictures, various frequencies of halftones, contones, etc.). Typically, windows are generated and classified for the contents of the rolling band buffer 14 after each input scanline is stored in the rolling band buffer 14. Window generation and classification may be delayed until the rolling band buffer 14 is filled or, if the image to be rendered has less scanlines than the rolling band buffer 14, until the last scanline of the image is stored.

Previous results of window generation and classification are monitored so that merging of previously identified multiple windows into a single window can be detected in scanline SP. If a merge is detected, previous classifications of the multiple windows are compared by the windowing processor 16. The current classification of the merged window may also be compared to the previous classifications. If a mismatch between classifications associated with the merged window is detected, the windowing processor 16 recognizes that blended image processing and rendering is required for the associated windows in the scanlines currently stored in the rolling band buffer 14 (i.e., from output scanline RP to current scanline SP).

Previous results of window generation and classification are also monitored so that re-classification of a window can be detected. The current classification of the window is compared to the previous classification by the windowing processor 16. If a mismatch is detected, the windowing processor 16 recognizes that blended image processing and rendering is required for the window in the scanlines currently stored in the rolling band buffer 14 (i.e., from output scanline RP to current scanline SP).

The windowing processor 16 communicates window and classification information to the class-based rendering algorithms 18. If blended rendering is required, the windowing processor 16 also communicates information to the class-based rendering algorithms 18 and the blended rendering algorithm 20 to switch the image processor 10 from a class-based rendering mode to a blended rendering mode. In the blended rendering mode, the windowing processor 16 also communicates window and classification information to the blended rendering algorithm 20.

The class-based rendering algorithms 18 include rendering algorithms associated with each image type class that can be identified by the windowing processor 16. The class-based rendering algorithms 18 receive scanline RP image data from the rolling band buffer 14 and window and classification information from the windowing processor 16. The windowing processor 16 also provides mode selection information that determines whether the class-based rendering algorithms 18 will operate in the class-based rendering mode or the blended rendering mode. In the class-based rendering mode, each window of scanline RP designated for class-based rendering is processed using a class-based rendering algorithm selected according to the image type class of the window. The processed image data for the window portion in output scanline RP is communicated to the image output 22. The image output 22 may combine the processed image data with blended image data for portions of other windows in output scanline RP for rendering on a rendering device.

In blended rendering mode, a window portion in output scanline RP designated for blended rendering is separately processed using class-based rendering algorithms associated with multiple image type classifications of the window. The processed image data for the window portion in output scanline RP is communicated to the blended rendering algorithm 20 for blended rendering.

The blended rendering algorithm 20 is an adaptive algorithm that blends image processes in a manner that provides spatially adaptive rendering of a designated window between output scanline RP and current scanline SP. In the blended rendering mode, the blended rendering algorithm 20 receives processed image data for the designated window portion in scanline RP from the class-based rendering algorithms 18 and window generation and classification information from the windowing processor 16. The windowing processor 16 also provides mode selection information that enables the blended rendering algorithm 20 to operate in the blended rendering mode. In the blended rendering mode, the processed image data for the designated window portion in scanline RP associated with multiple image type classifications of the window are blended in a gradual manner that ultimately results in a rendered image without abrupt changes due to the class changes for the window. The blended image data for the window portion of output scanline RP is communicated to the image output 22. The image output 22 may combine the blended image data with processed image data for portions of other windows in output scanline RP for rendering on a rendering device.

Blended rendering is required, for example, when two windows with different image type classifications merge at scanline SP. Under these circumstances the two windows are actually a single window and should have been classified in the same image class. If the two windows were classified in different image type classes, image processing and rendering from output scanline RP to current scanline SP for the merged window requires blended processing and rendering. In the blended rendering mode, image processing is gradually changed for output scanline RP through current scanline SP from the class-based processing and rendering that was being performed on the two differently classified windows prior to output scanline RP. The result, when current scanline SP is rendered, is that there is no abrupt transition due to the two initial windows being classified differently. The blended image when current scanline SP is rendered may be a mixture (e.g., an average) of the two previously selected rendering algorithms. Alternatively, the blended image when current scanline SP is rendered may match either of the two previously selected rendering algorithms, gradually blending a first rendering algorithm to a second rendering algorithm. Still another alternative may occur when the merged image is classified in a third image class, different from both of the previous two image classes, where both the first and second rendering algorithms are blended to a third rendering algorithm associated with the third image class. In this alternative, the blended image when current scanline SP is rendered matches the third rendering algorithm.

Blended rendering is also required, for example, when a window is re-classified at scanline SP in a different image type class from its previous classification. This would typically occur when the image characteristics of the window have changed enough so that the current image type class for the window is different from an earlier classification. Here, blended rendering is based on blending the rendering algorithm associated with the earlier classification to the rendering algorithm associated with the new classification in a gradual manner. The resulting rendered image output includes a first portion based on the previous classification, a second portion beginning at output scanline RP based on a blended mixture of the previous and current classifications, and a third portion based on the current classification at scanline SP.

Figure 3:
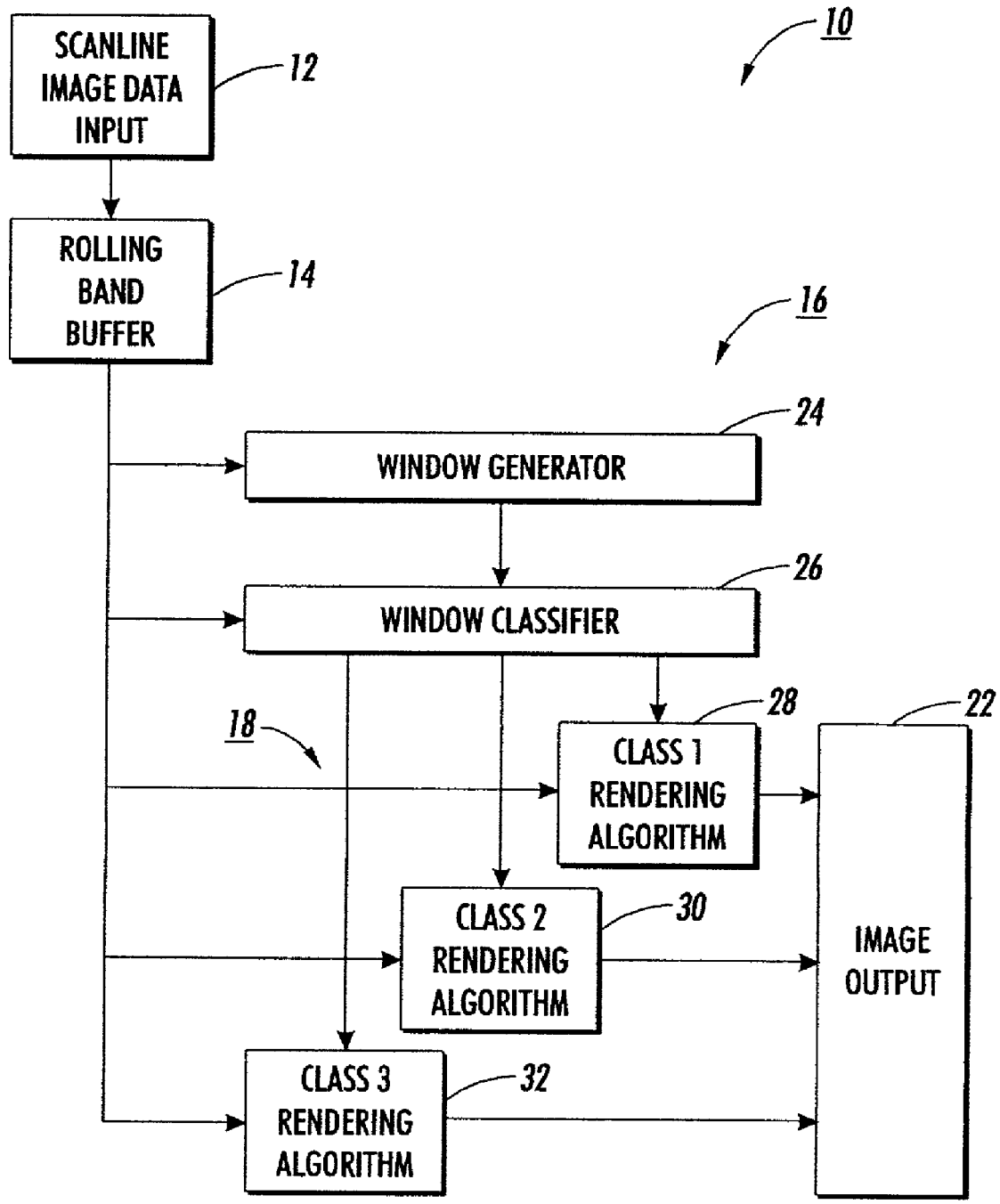
FIG. 3 shows a more detailed block diagram of the image processor of FIG. 2 in class-based rendering mode.

With reference to FIG. 3, a more detailed block diagram of the image processor 10 of FIG. 2 is shown in the class-based rendering mode. The scanline image data input 12, rolling band buffer 14, windowing processor 16, class-based rendering algorithms 18, and image output 22 of the image processor 10 operate in the class-based rendering mode. The windowing processor 16 includes a window generator 24 and a window classifier 26. As shown, the class-based rendering algorithms 18 include a class 1 rendering algorithm 28, a class 2 rendering algorithm 30, and a class 3 rendering algorithm 32. The class 1 rendering algorithm 28, for example, may be used to process image data that is classified in the text type class. The class 2 rendering algorithm 30, for example, may be for the halftone type class. The class 3 rendering algorithm 32, for example, may be for the contone type class. In practice, the class-based rendering algorithms 18 can include more or less rendering algorithms than the three shown and the rendering algorithms included can be for other known image type classes.

The window generator 24 receives image data from the rolling band buffer 14 and segments the image data into windows. The segmented image data is communicated to the window classifier 26. The window classifier 26 classifies the windows into image type classes (e.g., text, graphics, pictures, various frequencies of halftones, contones, etc.). The window classifier 26 communicates window and classification information for each window having a portion within scanline RP to the appropriate class-based rendering algorithms (e.g., class 1 rendering algorithm 28, class 2 rendering algorithm 30, and/or class 3 rendering algorithm 32) according to the image type class of the window.

Each class-based rendering algorithm called upon to process a portion of the image data in output scanline RP receives scanline RP image data from the rolling band buffer 14 and provides processed image data to the image output 22 for the appropriate window portion in scanline RP. The image output 22 combines the processed image data for rendering on a rendering device.

Figure 4:
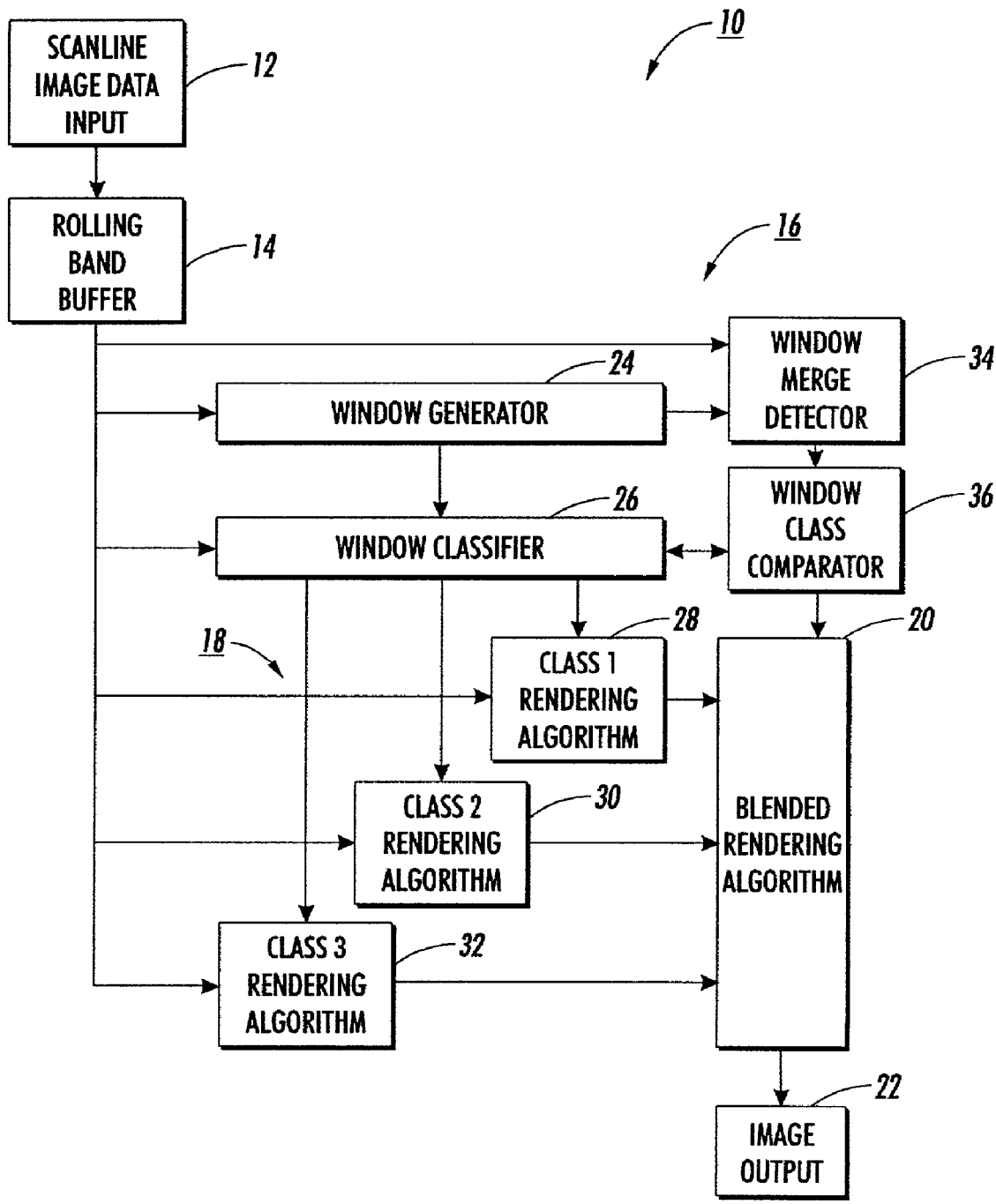
FIG. 4 shows a more detailed block diagram of the image processor of FIG. 2 in blended rendering mode.

With reference to FIG. 4, a more detailed block diagram of the image processor 10 of FIG. 2 is shown in the blended rendering mode. The scanline image data input 12, rolling band buffer 14, windowing processor 16, class-based rendering algorithms 18, blended rendering algorithm 20, and image output 22 of the image processor 10 operate in the blended rendering mode. The windowing processor 16 includes the window generator 24, the window classifier 26, a window merge detector 34, and a window class comparator 36. As shown, the class-based rendering algorithms 18 include the class 1 rendering algorithm 28, the class 2 rendering algorithm 30, and the class 3 rendering algorithm 32.

The window generator 24 receives image data from the rolling band buffer 14 and segments the image data into windows. The segmented image data is communicated to the window merge detector 34 and the window classifier 26. The window merge detector 34 monitors the previous results of window generation to detect when multiple previously identified windows merge into one window in scanline SP. When a window merge is detected, the window merge detector 34 communicates information associated with the merged window to the window class comparator 36.

The window classifier 26 receives the segmented image data from the window generator 24 and classifies the windows into image type classes (e.g., text, graphics, pictures, various frequencies of halftones, contones, etc.). The window classifier 26 communicates window and classification information to the window class comparator 36 of each window having a portion within scanline RP.

The window class comparator 36 monitors the previous classification of windows having a portion within scanline RP and detects when a class change is experienced. When a class change is experienced, the window class comparator 36 communicates information associated with the window in which a class change has been detected to the window classifier 26 and the blended rendering algorithm 20 to enable blended rendering for the associated window from output scanline RP to current scanline SP. Upon notice that blended rendering is required, the window classifier 26 communicates window and classification information to the appropriate class-based rendering algorithms (e.g., class 1 rendering algorithm, class 2 rendering algorithm, and/or class 3 rendering algorithm) according to the previous image type class(es) of the associated window(s) having a portion within output scanline RP and the current image type class of the associated window having a portion within current scanline SP.

Each class-based rendering algorithm called upon to process the image data for the associated window portion in scanline RP receives scanline RP image data from the rolling band buffer 14 and provides processed image data to the blended rendering algorithm 20. The blended rendering algorithm 20 blends the processed image data from the multiple class-based rendering algorithms in a manner that provides spatially adaptive rendering of the associated window between output scanlines RP and current scanline SP. The image output 22 combines the blended image data for the associated window portion in scanline RP with processed image data for portions of other windows in scanline RP for rendering output scanline RP on a rendering device.

Figure 5:
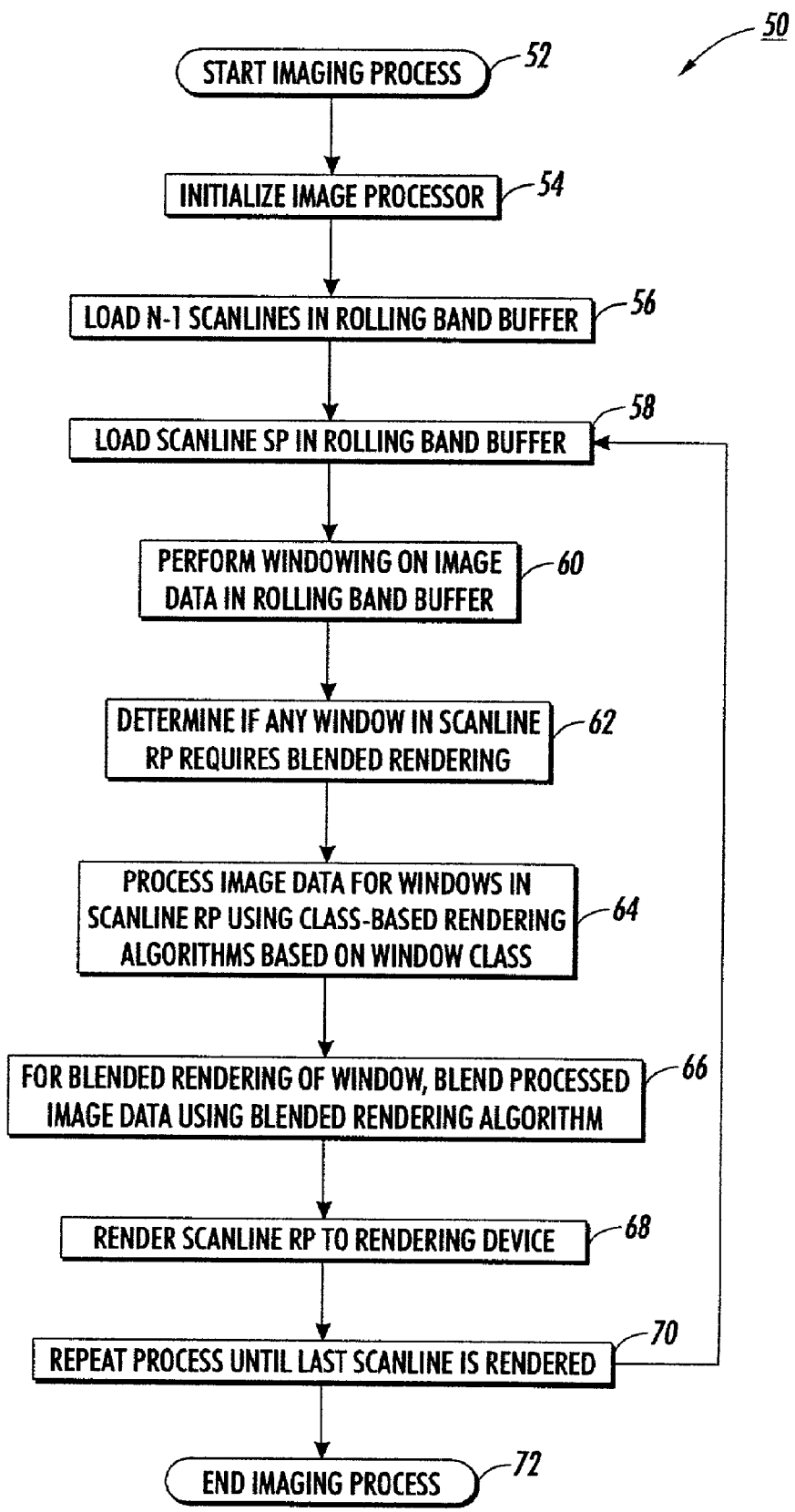
FIG. 5 is a simplified flowchart of an imaging process in an embodiment of the invention.

With reference to FIG. 5, a simplified flowchart of an imaging process 50 in an embodiment of the invention is provided. Generally, the imaging process 50 provides a method for segmenting data associated with an image into windows, classifying the image data within each window, and processing the data using a rendering algorithm so that processing and rendering occur during a single pass through the image data. The imaging process 50 includes a blended rendering algorithm that provides spatially adaptive blended or fuzzy rendering when class changes in a window are experienced.

More specifically, the imaging process 50 starts at step 52 when an input image is to be rendered. The imaging process is initialized 54, for example, by setting the size (N) of the rolling band buffer and establishing a scanline pointer (SP) and a renderline pointer (RP). Next, image data for the first N−1 scanlines of the image to be rendered is loaded into the rolling band buffer 56.

The process 50 begins a repetitive sequence of processing and rendering the image to be rendered scanline by scanline at step 58. The image data for scanline SP is loaded into the rolling band buffer 58 to fill the buffer. Windowing is performed on the image data in the rolling band buffer 60 to generate and classify windows into image type classes. Next, the process 50 determines if any window having a portion within scanline RP requires blended rendering 62. Recall that blended rendering is required when a window experiences a class change during the imaging process 50.

At step 64, the image data for each scanline RP window is processed using an appropriate class-based rendering algorithm. The class-based rendering algorithm is selected based on the image type class of the window and, when blended rendering is required, the previous image type class of the window. Step 66 is performed when it is determined in step 62 that one or more windows having a portion within scanline RP require blended rendering. At step 66, the image data processed for the window in step 64 is blended using the blended rendering algorithm. Next, the appropriate processed image data and, if required, blended image data for portions of other windows in output scanline RP are rendered to the rendering device 68. Steps 58 through 68 are repeated until the last scanline of the image is rendered. Alternatively, note that when the last scanline of the image is loaded into the rolling band buffer in step 58, steps 58 through 62 could be skipped or cycled through very quickly with no action because there are no further windowing operations when the remaining scanlines in the rolling band buffer are processed and rendered. The imaging process 50 ends at step 72 after the last scanline of the image is rendered.

Figure 6:
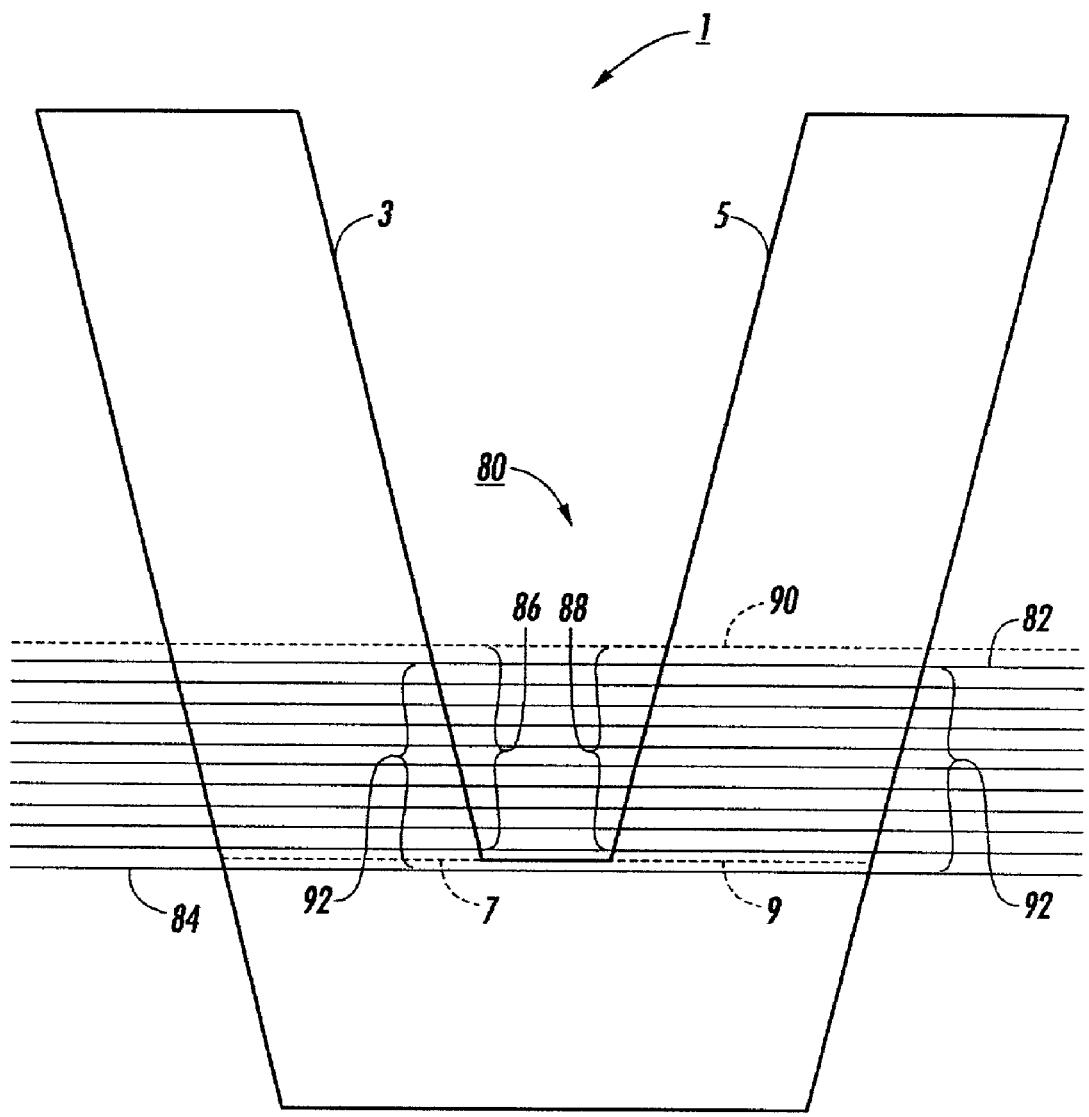
FIG. 6 shows a rolling band buffer advancing through the image of FIG. 1 with the "V"-shaped window.
Figure 7:
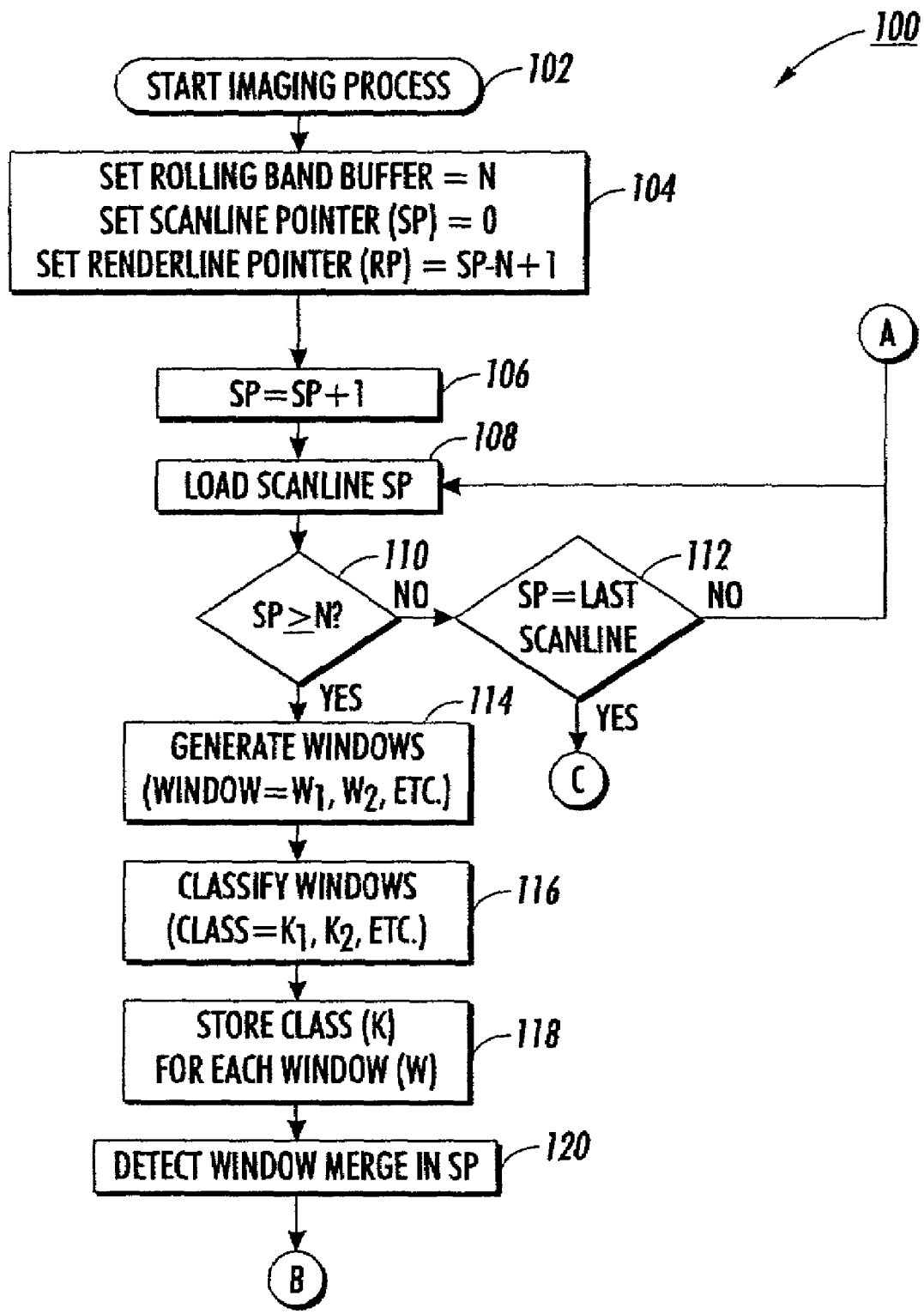
FIGS. 7–10 show a more detailed flowchart of an imaging process in an embodiment of the invention.
Figure 8:
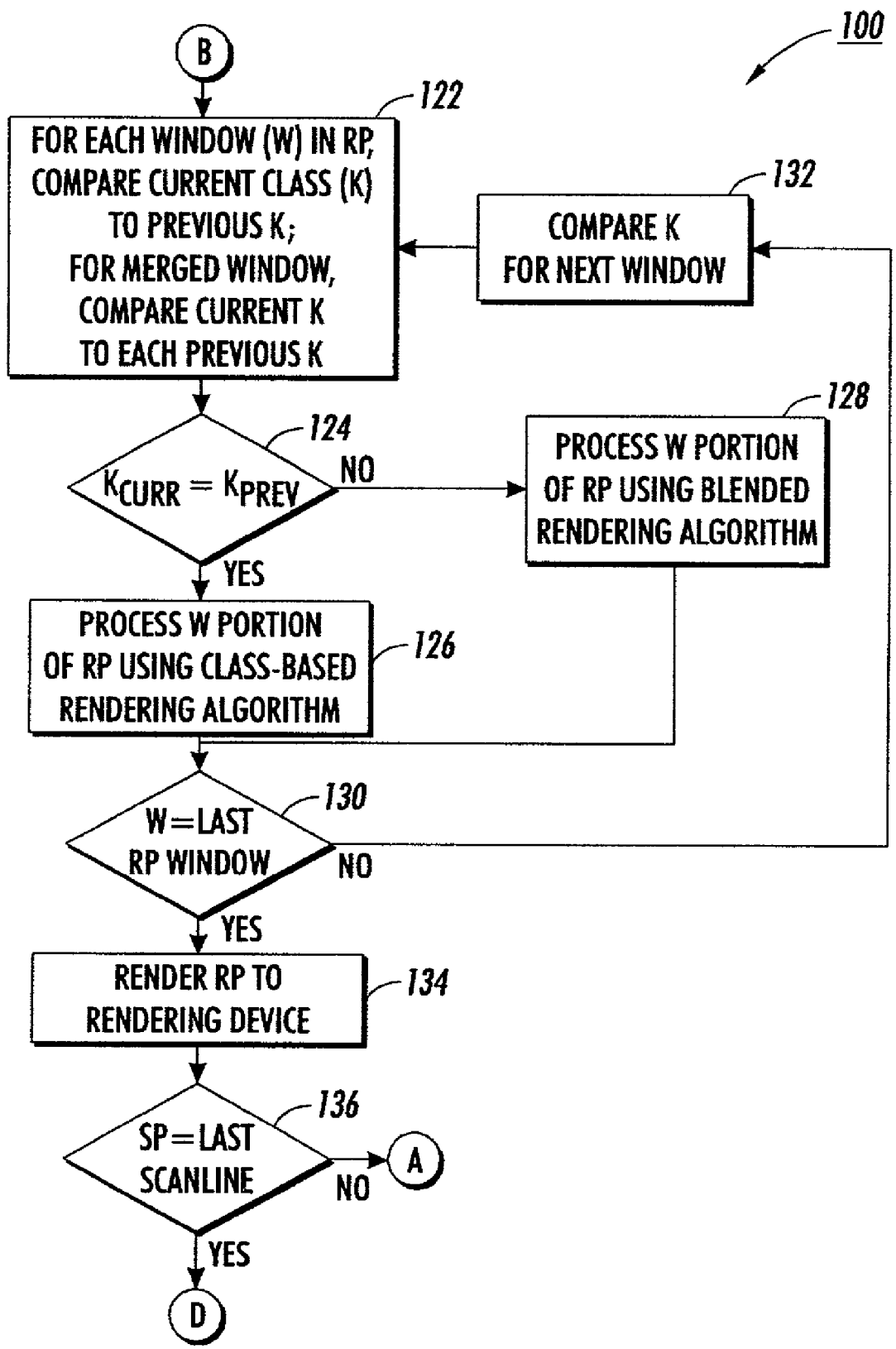
Figure 9:
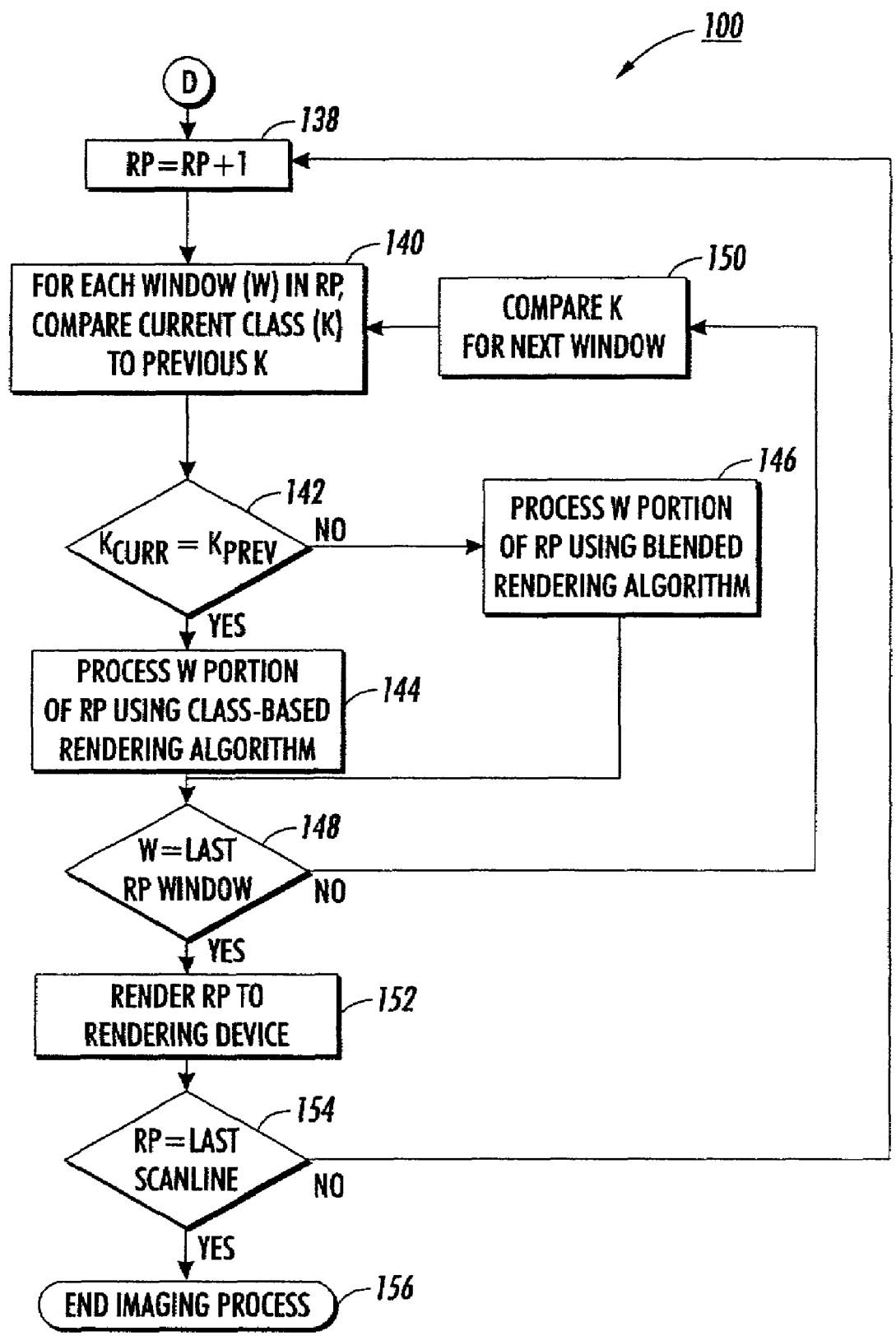
Figure 10:
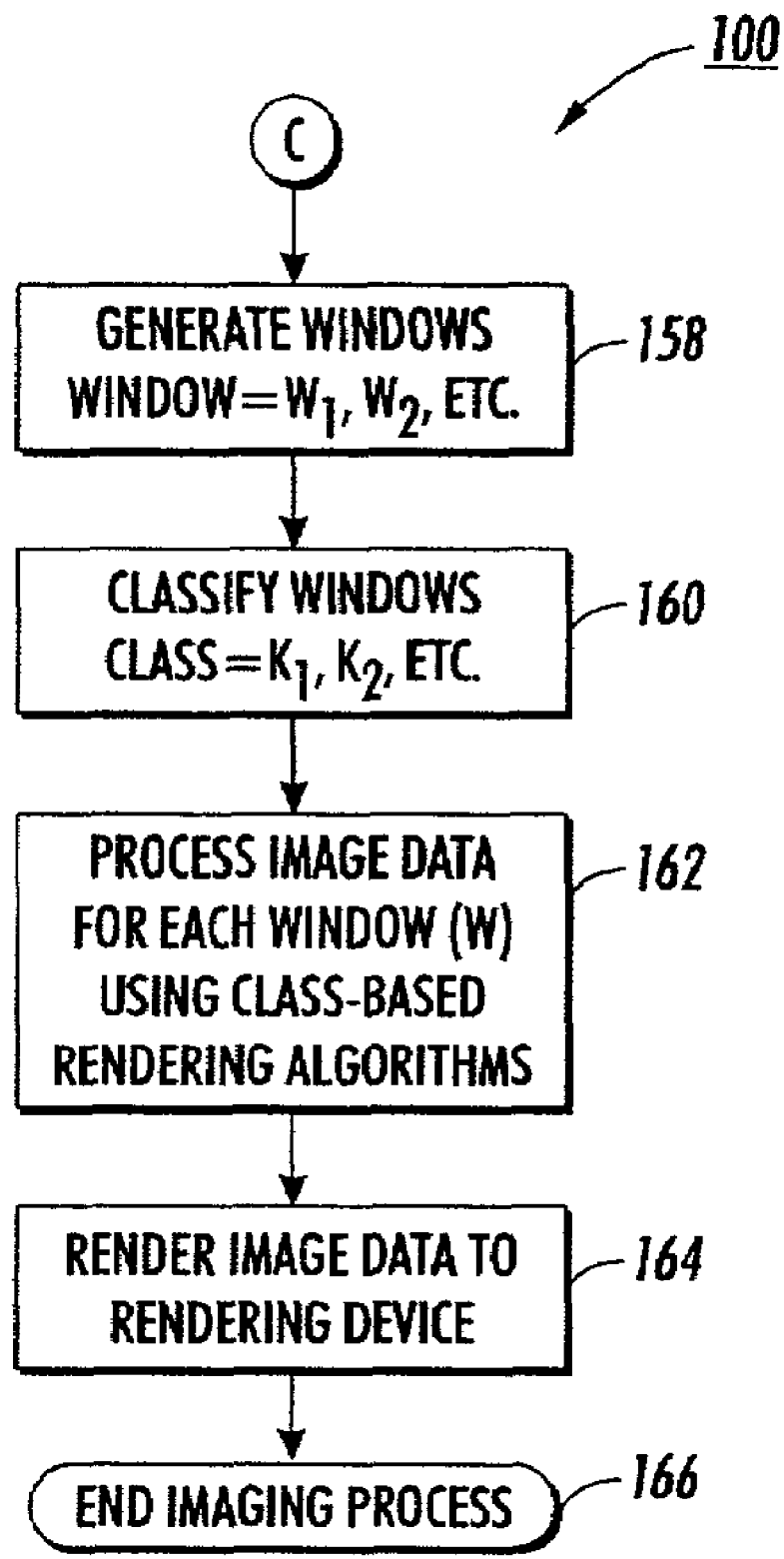

With reference to FIG. 6, a rolling band buffer 80 is shown advancing through the image with the "V"-shaped window 1 of FIG. 1. The "V"-shaped window 1 includes a left portion 3 and a right portion 5. The left portion 3 and the right portion 5 meet at two areas referred to as boundaries 7,9. A scenario that requires blended rendering using the imaging process 50 of FIG. 5 is described herein as the rolling band buffer 80 advances into the boundary areas 7,9. The rolling band buffer 80 is shown with ten scanlines to simplify the drawing and description. Typically, the buffer 80 has more scanlines. The actual number of scanlines (N) in the buffer 80 is selected so that a transition from one image type class at the top of the buffer to another image type class at the bottom of the buffer can be processed and rendered in a manner that produces a gradual blend that eliminates or minimizes undesirable image artifacts. The current top scanline or output scanline RP is identified as 82. The current bottom scanline or scanline SP is identified as 84.

For the scenario, assume that prior to the scanline with the boundary areas being loaded into the rolling band buffer 80 the left and right portions 3,5 of the "V"-shaped window 1 were generated as two separate windows. With respect to the process 50, assume the buffer 80 is filled and has cycled through steps 58 through 70 a number of times. In each previous cycle, assume two windows were generated, a first window 86 for the left portion 3 and a second window 88 for the right portion 5. In each previous cycle, also assume the first window 86 was classified as a halftone and the second window 88 was classified as a contone. The scanline rendered in the last cycle is identified as 90.

In the current cycle, the image data for scanline SP 84 is loaded in the buffer 80 at step 58. When scanline SP 84 is loaded, the image data for each scanline in the buffer 80 is shifted and the image data for the last rendered scanline 90 is removed from the buffer 80. When windowing is performed on the image data in the buffer 80 in step 60, one window 92 is generated. In step 62, merging of the first and second windows 86, 88 into the single window 92 is detected in scanline SP 84. The imaging process 50 then determines that blended rendering is required for window 92 because the previously identified first and second windows 86, 88 were previously classified in different image type classes (i.e., halftone for the first window and contone for the second window). At step 64, the image data for portions of the single window 92 within scanline RP 82 is processed two times, one time using the class-based rendering algorithm associated with a halftone and another time using the class-based rendering algorithm associated with a contone. Next, the processed image data for portions of the single window 92 within scanline RP 82 are blended using the blended rendering algorithm in step 66. At step 68, the blended image data for output scanline RP 82 is rendered to the rendering device. The blended image data in scanline RP 82 represents a first step of an incremental gradual change that will ultimately reach a point (e.g., average or midpoint) between halftone and contone rendering when current scanline SP 84 is rendered.

With reference to FIGS. 7–10, a more detailed flowchart of the imaging process 100 in an embodiment of the invention is provided. Like the imaging process 50 of FIG. 5, the imaging process 100 of FIGS. 7–10 generally provides a method for segmenting data associated with an image into windows, classifying the image data within each window, and processing the data using a rendering algorithm so that processing and rendering occur during a single pass through the image data. Like in FIG. 5, the imaging process 100 in FIGS. 7–10 includes a blended rendering algorithm that provides spatially adaptive blended or fuzzy rendering when class changes in a window are experienced. The imaging process 100 in FIGS. 7–10 expands the steps shown in FIG. 5, particularly in the areas of loading the rolling band buffer, determining when blended rendering is required, rendering scanlines after the last scanline is loaded in the buffer, and rendering an image that contains less scanlines than the buffer.

More specifically, the imaging process 100 starts at step 102 when an input image is to be rendered. First, the imaging process is initialized by setting the size of the rolling band buffer equal to N, setting the scanline pointer (SP) equal to zero, and setting the renderline pointer (RP) equal to (SP−N+1) 104. Next, the process 100 begins a loop to load the rolling band buffer by incrementing SP by one 106. The image data for scanline SP is loaded into the rolling band buffer 108. The loop is controlled by determining if SP is greater than or equal to N 110. If SP is not greater than or equal to N, the process determines if current scanline SP is the last scanline in the image to be rendered 112. If scanline SP is not the last scanline in the image, the process returns to step 106 and continues loading the buffer.

At step 110, if SP is greater than or equal to N the rolling band buffer is loaded and the process 100 begins to perform windowing on the image data in the buffer. First, windows are generated for the image data in the buffer 114. Windows may be identified as $W_1$, $W_2$, etc. Next, the windows are classified into image type classes 116. Window classes may be identified as $K_1$, $K_2$, etc. Window (W) and class (K) information are stored 118. Next, any merging of multiple previously identified windows into one window within current scanline SP is detected 120.

At step 122, the process 100 begins a loop that determines whether class-based rendering or blended rendering is required for each window having a portion within output scanline RP. For each window, the current class (K) will be compared to the previous class (K) 122. If merging was detected in current scanline SP for the window, the current class (K) will be compared to the previous classes (K) of each of the windows that merged. Alternatively, the previous classes (K) of the windows that merged can be compared to each other. Next, for a first window having a portion within output scanline RP, the current class (K) is compared to the previous class (K) 124. If the classes (K) are equal, the window portion in scanline RP is processed using a class-based rendering algorithm 126. If the classes (K) are not equal, a class change has been experienced and the window portion in scanline RP is processed using a blended rendering algorithm 128. The loop is controlled by determining if the current window is the last window having a portion within scanline RP 130. If the window is not the last window, the next window is selected 132 and the process returns to step 122.

At step 130, if the current window is the last window, image processing for output scanline RP is complete. Next, the processed image data for output scanline RP is rendered to a rendering device 134. At step 136, the process determines if there is another scanline in the image to load into the rolling band buffer by determining if current scanline SP is the last scanline. If scanline SP is not the last scanline, there is another scanline to load and the process returns to step 106.

At step 136, if current scanline SP is the last scanline, there are no additional scanlines in the image to load into the rolling band buffer and the process begins a loop that processes and renders the scanlines in the buffer. First, the renderline pointer (RP) is incremented by one 138. Next, the process 100 begins a nested loop that determines whether class-based rendering or blended rendering is required for each window having a portion within output scanline RP. For each window, the current class (K) will be compared to the previous class K) 140. Next, for a first window having a portion within output scanline RP, the current class (K) is compared to the previous class (K) 142. If the classes (K) are equal, the window portion in scanline RP is processed using a class-based rendering algorithm 144 If the classes (K) are not equal, a class change has been experienced and the window portion in scanline RP is processed using a blended rendering algorithm 146. The nested loop is controlled by determining if the current window is the last window having a portion within scanline RP 148. If the window is not the last window, the next window is selected 150 and the process returns to step 140. At step 148, if the window is the last window, image processing for output scanline RP is complete. Next, the processed image data for output scanline RP is rendered to a rendering device 152. At step 154, the process determines whether there is another scanline in the buffer to render by determining if output scanline RP is the last scanline. If output scanline RP is not the last scanline, there is another scanline to render and the process returns to step 138. At step 154, if output scanline RP is the last scanline, there are no more scanlines in the image to render and the process is ended 156.

At step 112, if current scanline SP is the last scanline, there are no additional scanlines in the image to load into the rolling band buffer and the process begins to perform windowing on the image data in the buffer. First, windows are generated for the image data in the buffer 158. Windows may be identified as $W_1$, $W_2$, etc. Next, the windows are classified into image type classes 160. Window classes may be identified as $K_1$, $K_2$, etc. Then, the image data for each window (W) is processed using a class-based rendering algorithm based on the class (K) of the window (W) 162. Next, the processed image data is rendered to a rendering device 164. At step 166, the process is ended.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof

What is claimed is:

1. A method for processing image data during a single pass through an image, comprising the following steps:
   a) loading a scanline of image data into a first-in-first-out rolling band buffer after the buffer is full;
   b) performing windowing on the image data in the buffer to generate windows and classify windows according to an image type class;
   c) determining if a class change was experienced by any window in the scanline during first-in-first-out traversal of the scanline from the input of the buffer to the output of the buffer;
   d) if a class change was experienced for a window in the output scanline of the buffer, processing image data in the output scanline for that window using a blended rendering algorithm; and
   e) if a class change was not experienced for a window in the output scanline of the buffer, processing image data in the output scanline for that window using a class-based rendering algorithm associated with the image type class for the window.

2. The method as set forth in claim 1, further comprising the following steps prior to step a):
   f) loading scanlines of image data into a first-in-first-out rolling band buffer until the buffer is full;
   g) performing windowing on the image data in the buffer to generate windows and classify windows according to an image type class; and
   h) processing image data for each window in the output scanline of the buffer using a class-based rendering algorithm associated with the image type class for the window.

3. The method as set forth in claim 2, further comprising the following step:
   i) rendering the processed image data for the output scanline of the buffer to a rendering device.

4. The method as set forth in claim 1, further comprising the following step:
   f) repeating steps a) through e) until the last scanline of the image is loaded into the buffer.

5. The method as set forth in claim 1, further comprising the following steps:
   f) rendering the processed image data for the output scanline of the buffer to a rendering device;
   g) repeating steps a) through f) until the last scanline of the image is loaded into the buffer; and
   h) repeating steps c) through f) until the last scanline of the image is rendered to the rendering device.

6. The method as set forth in claim 1, step b) further comprising the following step:
   f) detecting merging of multiple windows generated during previous windowing into a single window in the input scan line of the buffer.

7. The method as set forth in claim 6, wherein, if a window merge is detected in step f) and the merged window is associated with the output scanline, step c) further comprising the following step:
   g) determining if a class change was experienced by the merged window in the output scanline of the buffer during traverse of the scanline from the input of the buffer to the output of the buffer with respect to the class of each previous window associated with the merged window.

8. The method as set forth in claim 7, wherein, if a window merge is detected in step f) and the merged window is associated with the output scanline, step d) further comprising the following step:

h) processing image data in the output scanline associated with the merged window using the blended rendering algorithm such that each previous window associated with the merged window that was previously classified in a different image type is gradually blended between the current output scanline of the buffer and the current input scanline of the buffer to match the image type of the merged window.

9. The method as set forth in claim 6, wherein, if a window merge is detected in step f) and the merged window is associated with the output scanline, step c) further comprising the following step:

g) determining if a class change is experienced when comparing the class of each previous window associated with the merged window.

10. The method as set forth in claim 9, wherein, if a window merge is detected in step f) and the merged window is associated with the output scan line, step d) further comprising the following step:

h) processing image data in the output scanline associated with the merged window using the blended rendering algorithm such that each previous window associated with the merged window is gradually blended between the current output scanline of the buffer and the current input scanline of the buffer in a smooth transition.

11. The method as set forth in claim 1, step d) further comprising the following step:

f) processing image data in the output scanline associated with the window in which the class change was experienced using the blended rendering algorithm such that each previous window associated with a merged window is gradually blended between the current output scanline of the buffer and the current input scanline of the buffer in a smooth transition.

12. A method for processing and rendering image data during a single pass through an image, comprising the following steps:

a) loading an initial set of scanlines of image data into a first-in-first-out rolling band buffer until the buffer is full;

b) performing windowing on the image data in the buffer to generate windows and classify windows according to an image type class;

c) processing image data for each window in the initial set of scanlines, as they are sequentially output from the buffer, using a class-based rendering algorithm associated with the image type class for the window;

d) rendering the processed image data for the initial set of scanlines of the buffer to a rendering device;

e) loading a current scanline of image data into the buffer concurrently with outputting a scanline of the initial set of scanlines;

f) performing windowing on the image data in the buffer to generate windows and classify windows according to an image type class, and detecting merging of multiple windows generated during previous windowing into a single merged window in the input scanline of the buffer;

g) determining if a class change was experienced by any window in the current scanline of the buffer during first-in-first-out traversal of the current scanline from the input of the buffer to the output of the buffer, at which point the current scanline becomes an output scanline;

h) if a class change was experienced for a window in the output scanline of the buffer, processing image data in the output scanline for that window using a blended rendering algorithm;

i) if a class change was not experienced for a window in the output scanline of the buffer, processing image data in the output scanline for that window using a class-based rendering algorithm associated with the image type class for the window; and j) rendering the processed image data for the output scanline of the buffer to a rendering device.

13. The method as set forth in claim 12, further comprising the following steps:

k) repeating steps e) through j) until the last scanline of the image is loaded into the buffer; and l) repeating steps g) through j) until the last scanline of the image is rendered to the rendering device.

14. The method as set forth in claim 12, wherein, if a window merge is detected in step k) and the merged window is associated with the output scanline, step g) further comprising the following step:

l) determining if a class change was experienced by the merged window in the output scanline of the buffer during traverse of the scanline from the input of the buffer to the output of the buffer with respect to the class of each previous window associated with the merged window.

15. The method as set forth in claim 14, wherein, if a window merge is detected in step k) and the merged window is associated with the output scanline, step h) further comprising the following step:

m) processing image data in the output scanline associated with the merged window using the blended rendering algorithm such that each previous window associated with the merged window that was previously classified in a different image type is gradually blended between the current output scanline of the buffer and the current input scanline of the buffer to match the image type of the merged window.

16. The method as set forth in claim 12, wherein, if a window merge is detected in step k) and the merged window is associated with the output scanline, step g) further comprising the following step:

l) determining if a class change is experienced when comparing the class of each previous window associated with the merged window.

17. The method as set forth in claim 16, wherein, if a window merge is detected in step k) and the merged window is associated with the output scanline, step h) further comprising the following step:

m) processing image data in the output scanline associated with the merged window using the blended rendering algorithm such that each previous window associated with the merged window is gradually blended between the current output scanline of the buffer and the current input scanline of the buffer in a smooth transition.

18. The method as set forth in claim 12, step h) further comprising the following step:

k) processing image data in the output scanline associated with the window in which the class change was experienced using the blended rendering algorithm such that each previous window associated with the merged window is gradually blended between the current output scanline of the buffer and the current input scanline of the buffer in a smooth transition.

19. An image processor for processing image data during a single pass through an image, comprising:
   a first-in-first-out rolling band buffer for receiving image data in a scanline by scanline fashion from a source, the buffer comprising a plurality of scanlines, including an input scan line and an output scan line;
   a windowing processor in communication with the buffer for segmenting the image data in the buffer into windows and classifying each window according to an image type class, and determining if blended rendering is required for a window;
   class-based rendering algorithms in communication with the buffer and the windowing processor and associated with image type classes for processing image data associated with a portion of one or more windows in the output scanline according to the image type class associated with the window; and
   a blended rendering algorithm in communication with the class-based rendering algorithms and the windowing processor for blending processed image data from the class-based rendering algorithms for each window portion in the output scanline requiring blended rendering;
   wherein the windowing processor comprises a window class comparator that determines whether a class change has occurred for a window in the output scanline.

20. The image processor as set forth in claim 19, the windowing processor further comprising:
   a window generator;
   a window classifier in communication with the window generator; and
   a window merge detector in communication with the window generator;
   wherein the window class comparator is in communication with the window merge detector and the window classifier.

* * * * *